(12) United States Patent
Richardson et al.

(10) Patent No.: US 9,431,831 B1
(45) Date of Patent: Aug. 30, 2016

(54) UPDATING FIRMWARE FOR CHARGING DEVICE

(71) Applicant: GOOGLE INC., Mountain View, CA (US)

(72) Inventors: William Frank Richardson, Santa Clara, CA (US); Randall R. Spangler, San Jose, CA (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 14/341,246

(22) Filed: Jul. 25, 2014

(51) Int. Cl.
*H02J 7/00* (2006.01)
*G06F 1/00* (2006.01)
*G06F 11/30* (2006.01)
*H02J 7/02* (2016.01)

(52) U.S. Cl.
CPC ............ *H02J 7/0004* (2013.01); *H02J 7/0052* (2013.01); *H02J 7/02* (2013.01)

(58) Field of Classification Search
CPC ......... H02J 7/0004; H02J 7/0052; H02J 7/02
USPC .................. 320/107; 713/300, 340
See application file for complete search history.

(56) References Cited

U.S. PATENT DOCUMENTS

| | | | | |
|---|---|---|---|---|
| 7,114,658 B2 * | 10/2006 | Lima | ....................... | G06F 1/263 235/492 |
| 7,130,463 B1 * | 10/2006 | Spangler | ............... | G06K 9/4642 382/168 |
| 7,500,115 B2 * | 3/2009 | Berke | ...................... | G06F 1/263 711/106 |
| 7,835,877 B2 * | 11/2010 | Zaman | .................. | G06F 1/3203 320/155 |
| 7,877,618 B2 * | 1/2011 | Lewis | ..................... | G06F 1/266 713/300 |
| 2001/0045779 A1 * | 11/2001 | Lee | .......................... | H02J 9/061 307/66 |
| 2004/0175598 A1 * | 9/2004 | Bliven | ...................... | H02J 7/34 713/340 |
| 2010/0317401 A1 * | 12/2010 | Lee | ................... | G06F 17/30575 455/557 |
| 2013/0288600 A1 * | 10/2013 | Kuusilinna | ........... | H02J 7/0004 455/41.2 |
| 2014/0380030 A1 * | 12/2014 | Jain | .......................... | G06F 1/26 713/2 |
| 2015/0163093 A1 * | 6/2015 | Radford | ................ | H02J 7/0009 709/220 |

OTHER PUBLICATIONS

Kerner, "Black Hat: MACTANS Hacking Apple iOS with a Battery Charger", eSecurity Planet: Internet Security for IT professionals, Jul. 31, 2013, retrieved on Jun. 6, 2014 from http://www.securityplanet.com/print/mobile-security/black-hat-mactans-hacking-apple, 2 pages.

(Continued)

*Primary Examiner* — M'Baye Diao
(74) *Attorney, Agent, or Firm* — Brake Hughes Bellermann LLP

(57) ABSTRACT

A charging device may include a computer plug, outlet plug, AC-to-DC converter, controller, and memory. The computer plug may provide power to a computing device and receive data from the computing device. The outlet plug may receive alternating current (AC) power from an electrical outlet. The AC-to-DC converter may convert the AC power into direct current (DC) power and provide the DC power to the computing device via the computer plug. The controller may control a voltage and/or current of the DC power based on data received from the computing device and instructions stored in a memory. The memory may include read-only instructions for the controller to modify a read-write portion of the memory based on data received from the computing device via the computer plug, and read-write instructions for the controller to set the voltage of the DC power based on the data received from the computing device.

22 Claims, 10 Drawing Sheets

(56) References Cited

OTHER PUBLICATIONS

Hoffman, "HTG Explains: Can You Use Any Charger With Any Device?" How-To Geek Discussion, retrieved on Jul. 17, 2014 from http://discuss.howtogeek.com/t/htg-explains-can-you-use-any-charger-with-any-device/10678/3, 8 pages.

Nadel, "USB Type-C: Simpler, faster and more powerful", ComputerWorld, Apr. 15, 2014, retrieved on Jun. 6, 2014 from http://www.computerworld.com/s/article/print/9247638/USB-Type_C_Simpler_faster_and_more_powerful?taxonomyName=Computer+Peripherals&taconomyID=23, 3 pages.

"What Can Chromebook Teach Us About Mobile Security?", InformationWeek, retrieved on Jun. 12, 2014 from http://www.informationweek.com/mobile/what-can-chromebook-teach-us-about-mobile-security/d/d-id/1099293?print=yes, 3 pages.

\* cited by examiner

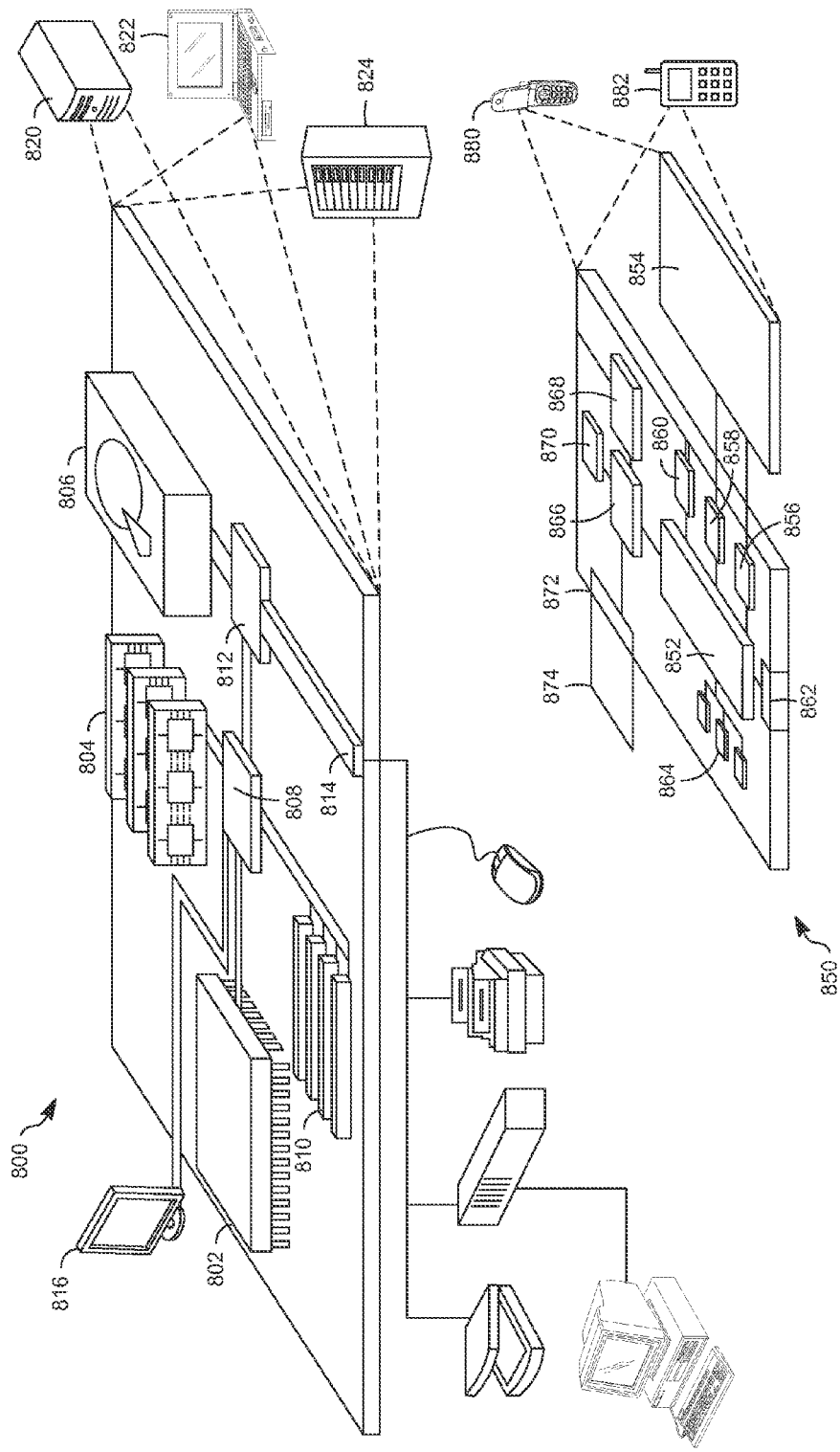

UPDATING FIRMWARE FOR CHARGING DEVICE

TECHNICAL FIELD

This description relates to charging devices.

BACKGROUND

Electronic devices, such as computing devices, may require electricity to operate. A charging device may receive electricity from an electrical outlet and provide the electricity to a computing device, thereby providing power to the computing device. To reduce the number of charging devices each person needs to own, different types of devices, such as cellphones or smartphones, laptop or notebook computers, and tablet computers, may share a common form factor at a power input that couples to the charging device. The charging device may modify the power provided to the computing device based on the type of computing device.

SUMMARY

According to an example embodiment, a charging device may include a computer plug, an outlet plug, an AC-to-DC converter, a controller, and a memory. The computer plug may be configured to provide power to a computing device and receive data from the computing device. The outlet plug may be configured to receive alternating current (AC) power from an electrical outlet. The AC-to-DC converter may be configured to convert the AC power received by the outlet plug from the electrical outlet into direct current (DC) power and provide the DC power to the computing device via the computer plug. The controller may be configured to control a voltage and/or current of the DC power based on data received from the computing device and instructions stored in a memory. The memory may include a read-only portion comprising instructions for the controller to modify a read-write portion of the memory based on data received from the computing device via the computer plug, and the read-write portion comprising instructions for the controller to set the voltage of the DC power based on the data received from the computing device.

According to another example embodiment, a charging device may include a computer plug, an outlet plug, an AC-to-DC converter, a controller, a memory, and a switch. The computer plug may be configured to provide power to a computing device and receive data from the computing device. The outlet plug may be configured to receive alternating current (AC) power from an electrical outlet. The AC-to-DC converter may be configured to convert the AC power received by the outlet plug from the electrical outlet into direct current (DC) power and provide the DC power to the computing device via the computer plug. The controller may be configured to control a voltage of the DC power based on data received from the computing device and instructions stored in a memory. The memory may include a read-only portion comprising instructions for the controller to modify a read-write portion based on data received from the computing device via the computer plug, and the read-write portion comprising instructions for the controller to set the voltage of the DC power based on the data received from the computing device. The switch may be configured to enable a user to toggle the charging device between a first mode in which the charging device can provide power to the computing device but cannot modify the read-write portion of the memory, and a second mode in which the charging device can modify the read-write portion of the memory but cannot provide power to the computing device.

According to another example embodiment, a charging device may include a computer plug, an outlet plug, an AC-to-DC converter, a controller, and a memory. The computer plug may be configured to provide power to a computing device and receive data from the computing device. The outlet plug may be configured to receive alternating current (AC) power from an electrical outlet. The AC-to-DC converter may be configured to convert the AC power received by the outlet plug from the electrical outlet into direct current (DC) power and provide the DC power to the computing device via the computer plug. The controller may be configured to control a voltage of the DC power based on data received from the computing device and instructions stored in the memory. The memory may include a read-only portion comprising instructions for the controller to modify a read-write portion based on data received from the computing device via the computer plug, start a timer upon receiving power via the outlet plug, if the charging device receives an update request from the computing device before the timer expires, modify the read-write portion based on data received from the computing device via the computer plug after receiving the update request, and if the charging device does not receive an update request from the computing device before the timer expires, exit the update mode and not modify the read-write portion. The memory may also include the read-write portion comprising instructions for the controller to set the voltage of the DC power based on the data received from the computing device.

According to another example embodiment, a computing device may include a processor, a memory, a display, a power input, and a power device controller. The processor may be configured to execute instructions. The memory may include instructions executable by the processor. The display may be configured to present images based on instructions received from the processor. The power input may be configured to receive power from a charging device, provide power to the processor, the memory, and the display, and send instructions to the charging device. The power device controller may be configured to send instructions to the charging device via the power input. The memory may include instructions configured to cause the processor to determine that the charging device needs a firmware update, and based on determining that the charging device needs a firmware update, instruct the display to present an image prompting a user to move a switch on the charging device.

According to another example embodiment, a charging device may include means for providing power to a computing device and receiving data from the computing device. The charging device may also include means for receiving alternating current (AC) power from an electrical outlet. The charging device may also include means for converting the AC power direct current (DC) power and providing the DC power to the computing device. The charging device may also include means for controlling a voltage and/or current of the DC power based on data received from the computing device and stored instructions. The charging device may also include means for modifying a read-write portion of memory based on data received from the computing device, and means for setting the voltage of the DC power based on the data received from the computing device.

According to another example embodiment, the charging device may also include means for providing power to a computing device and receive data from the computing device. The charging device may also include means for receiving alternating current (AC) power from an electrical outlet. The charging device may also include means for converting the AC power into direct current (DC) power and providing the DC power to the computing device. The charging device may also include means for controlling a voltage of the DC power based on data received from the computing device and stored instructions. The charging device may also include means for modifying a read-write portion of memory based on data received from the computing device, and means for setting the voltage of the DC power based on the data received from the computing device. The charging device may also include means for enabling a user to toggle the charging device between a first mode in which the charging device can provide power to the computing device but cannot modify the read-write portion of the memory, and a second mode in which the charging device can modify the read-write portion of the memory but cannot provide power to the computing device.

According to another example embodiment, the charging device may also include means for providing power to a computing device and receiving data from the computing device. The charging device may also include means for receiving alternating current (AC) power from an electrical outlet. The charging device may also include means for converting the AC power into direct current (DC) power and providing the DC power to the computing device. The charging device may also include means for controlling a voltage of the DC power based on data received from the computing device and stored instructions. The charging device may also include means for modifying a read-write portion of memory based on data received from the computing device, starting a timer upon receiving power, means for modifying the read-write portion of memory based on data received from the computing device after receiving an update request if the charging device receives the update request from the computing device before the timer expires, and means for exiting the update mode and not modifying the read-write portion if the charging device does not receive an update request from the computing device before the timer expires. The charging device may also include means for setting the voltage of the DC power based on the data received from the computing device.

According to another example embodiment, a computing device may include means for executing instructions. The computing device may also include means for storing the instructions. The computing device may also include means for presenting images based on instructions. The computing device may also include means for receiving power from a charging device and sending instructions to the charging device. The computing device may also include means for determining that the charging device needs a firmware update, and based on determining that the charging device needs a firmware update, means for presenting an image prompting a user to move a switch on the charging device.

The details of one or more implementations are set forth in the accompanying drawings and the description below. Other features will be apparent from the description and drawings, and from the claims.

BRIEF DESCRIPTION OF THE DRAWINGS

FIG. 8 shows an example of a generic computer device and a generic mobile computer device, which may be used with the techniques described here.

Like reference numbers refer to like elements.

DETAILED DESCRIPTION

A charging device may be designed to provide power to multiple types of computing devices, such as such as cellphones or smartphones, laptop or notebook computers, and tablet computers, which share a common form factor at a power input but have different power requirements. The charging device may include a processor and firmware configuring the charging device to communicate with the computing device, determine the appropriate power, voltage, or current level, provide power to the computing device at the determined power, voltage, or current level. After manufacture, the firmware included in the charging device may be determined to have bugs, perform less than optimal functions, or not be suited for newer computing devices. To address these possibilities, the charging device may be configured to receive updates to the firmware.

Figure 1A:
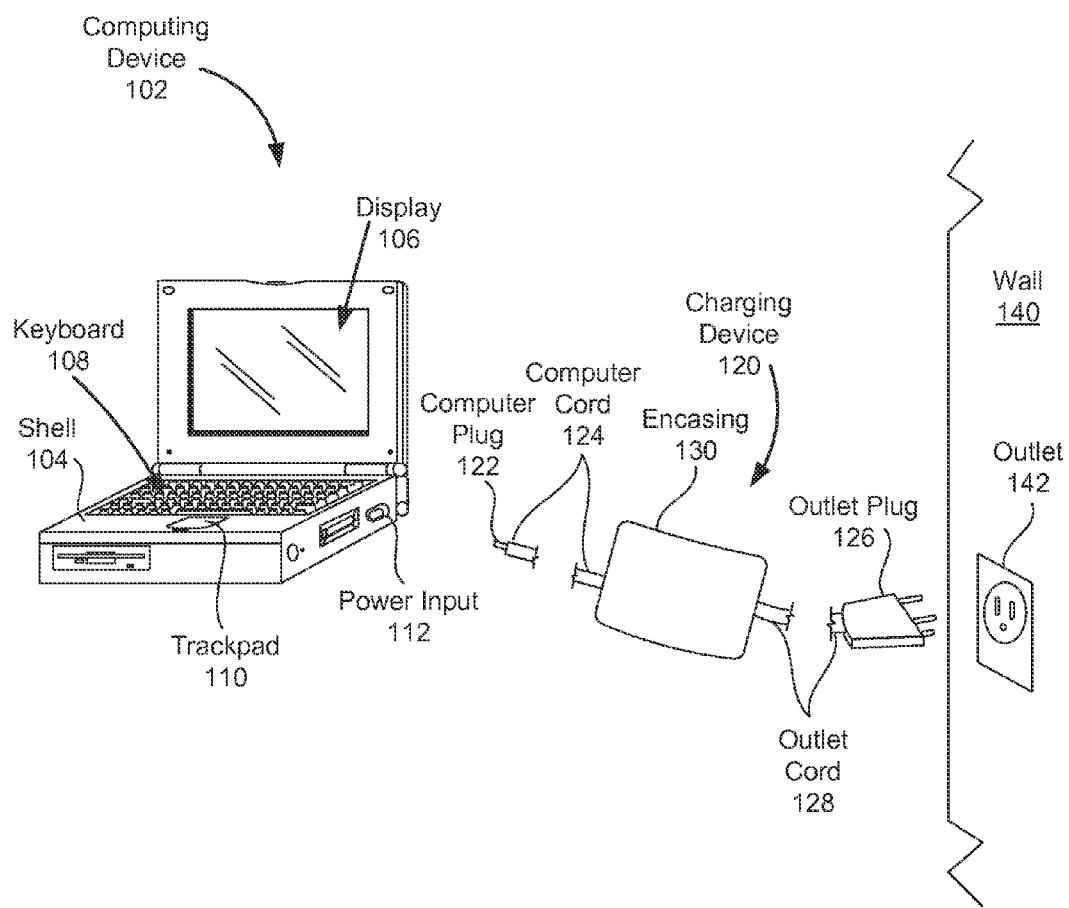
FIG. 1A is a diagram showing a computing device, a charging device, and an outlet.

FIG. 1A is a diagram showing a computing device 102, a charging device 120, and an outlet 142. The charging device 120 may receive electrical power from the electrical outlet 142, and provide the electrical power to the computing device 102. The charging device 120 may, for example, convert alternating current (AC) power received from the outlet 142 to direct current (DC) power, and provide the DC power to the computing device 102.

The computing device 102 may include a shell 104. The shell 104 may enclose components of the computing device 102, such as a processor, memory, a rechargeable battery, and internal portions of input and output components. The computing device 102 may include a display 106. The display 106 may present and/or display graphical information to a user. The display 106 may present graphical information to the user based on instructions from the processor (not shown in FIG. 1A) included in the computing device 102. The computing device 102 may also include one or more human interface devices, such as a keyboard 108 and/or a trackpad 110.

The computing device 102 may include a power input 112. The power input 112 may couple to the charging device 120. The power input 112 may receive power from the charging device 120 to recharge the battery and/or power components in the computing device 102.

The power input 112 may include a form factor, which may be in socket or receptacle form, which is common to different types of computing devices. The common form factor may enable the different types of computing devices to receive and be powered by the same charging device 120. The form factor may include, for example, a Universal Serial Bus (USB) Type-C receptacle.

The charging device 120 may include encasing 130. The encasing 130 may enclose and/or encase components of the charging device 120.

The charging device 120 may include an outlet cord 128 connected to an outlet plug 126. The outlet plug 126 may plug into an outlet 142 included in a wall 140. The outlet plug 126 may receive the AC power from the outlet 142 and provide the AC power to an AC-to-DC converter (not shown in FIG. 1A) included in the charging device 120 via the outlet cord 128.

The charging device 120 may also include a computer plug 122. The computer plug 122 may include a form factor, which may be in a plug form, which can be received by the power input 112 of the computing device and power inputs or receptacles of different kinds of computing devices. The common form factor may enable the charging device 120 to power different types of computing devices. The form factor may include, for example, a USB Type-C receptacle.

The computer plug 122 may plug into the power input 112 of the computing device 102. The charging device 120 may include a computer cord 124. The computer cord 124 may be coupled to the AC-to-DC converter and/or a controller (not shown in FIG. 1A) of the charging device 120. The computer plug 122 and computer cord 124 may transmit DC power, as well as communications signals or data, to the computing device 102 via the power input 112. The computer plug 122 and computer cord 124 may also receive communications signals or data from the computing device 102.

In an example embodiment, the charging device 120 may not include any user input modules. The example of the charging device 120 not including any user input modules may provide a pleasing visual appearance. In another example, the charging device 120 may include a user input module, such as a switch, which may prevent malicious changes to the charging device's 120 firmware.

Figure 1B:
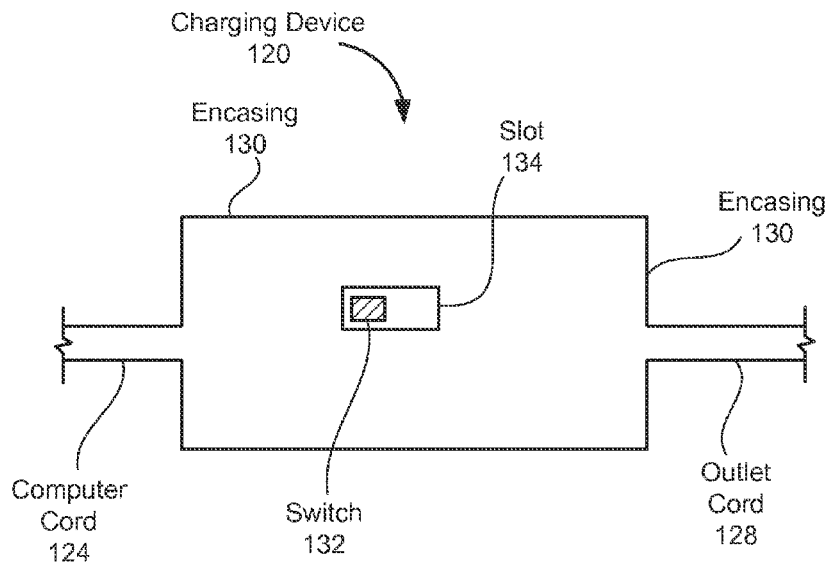
FIG. 1B is a diagram showing the charging device according to an example embodiment.

FIG. 1B is a diagram of the charging device 120 according to an example embodiment. In this example, the encasing 130 defines a slot 134. The slot 134 may allow a switch 132 to slide back and forth within the slot 134. The switch 132 may be switched or toggled by a user to change the state of the charging device 120. The switch 132 may control whether the charging device 120 is in a first state in which the charging device 120 can provide power to the computing device 102 (not shown in FIG. 1B) but cannot receive firmware updates, or a second state in which the charging device 120 can receive firmware updates from the computing device 102, but cannot provide power to the computing device 102. The switch 132 may allow the user to control whether the charging device 120 receives firmware updates, reducing the likelihood of malicious software infecting the charging device 120.

In another example, the switch 132 may be included on the outlet plug 126 (shown in FIG. 1A). The switch 132 may, for example, be included on a portion of the outlet plug 126 that faces the wall 140 (shown in FIG. 1A) when the outlet plug 126 is plugged into the outlet 142. Including the switch 132 on the portion of the outlet plug 126 that faces the wall 140 may ensure that the switch 132 is not carelessly moved.

In an example embodiment, the switch 132 may return to the original and/or first position, without user intervention, after the computing device 102 has completed updating the firmware of the charging device 120. The configuration of the charging device 120 to return the switch 132 to the first and/or original position without user intervention may make the firmware update process easier for the user.

In another example embodiment, rather than an external switch 132 being moved by the user, the charging device 120 may include a magnetic switch. The magnetic switch may cause the charging device 120 to change states or modes in similar manner to the external switch 132. The magnetic switch may be actuated by a magnetic field created by a magnet in proximity to the magnetic switch and/or charging device. The computing device 102 may prompt the user to bring the charging device into proximity with a magnet when the computing device 102 determines that a firmware update is needed. The computing device may prompt the user to bring the charging device into proximity with a magnet such as by presenting text on the display 106 instructing the user to place a magnet near the charging device 120 or place the charging device 120 near a magnet built into the computing device 102, such as a magnet that is near the display 106 that the computing device 102 uses to determine whether a lid of the computing device 102 is closed (in the example of a laptop or notebook computer).

Figure 1C:
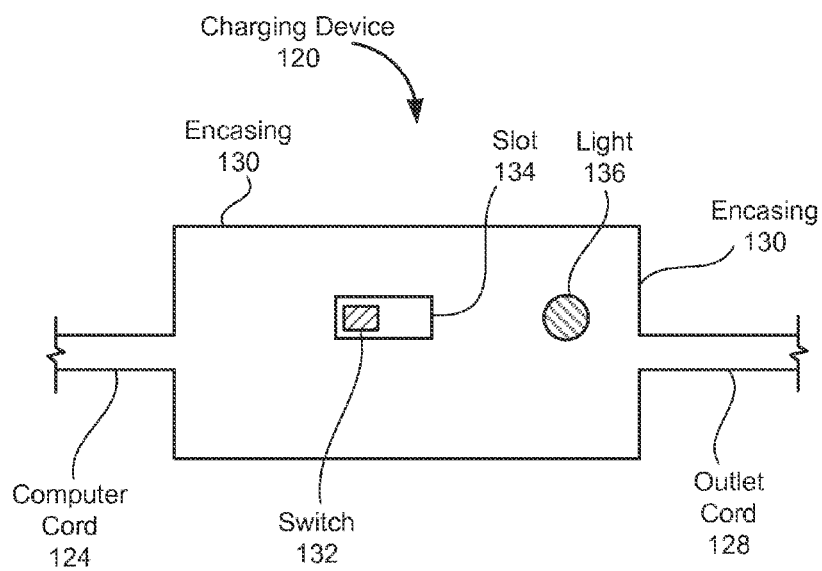
FIG. 1C is a diagram showing the charging device according to another example embodiment.

FIG. 1C is a diagram of the charging device 120 according to another example embodiment. In this example, the charging device 120 may include a switch 132 and slot 134, as described above with respect to FIG. 1B. In this example, the charging device 120 may also include a light 136. The light 136 may communicate to the user that the state of the charging device 120 needs to be changed, and/or that the switch 132 needs to be flipped, switched, toggled, or moved. The light 136 may, for example, change color, blink, or turn on to indicate to the user that the user should flip, switch, toggle, or move the switch 132.

Figure 2A:
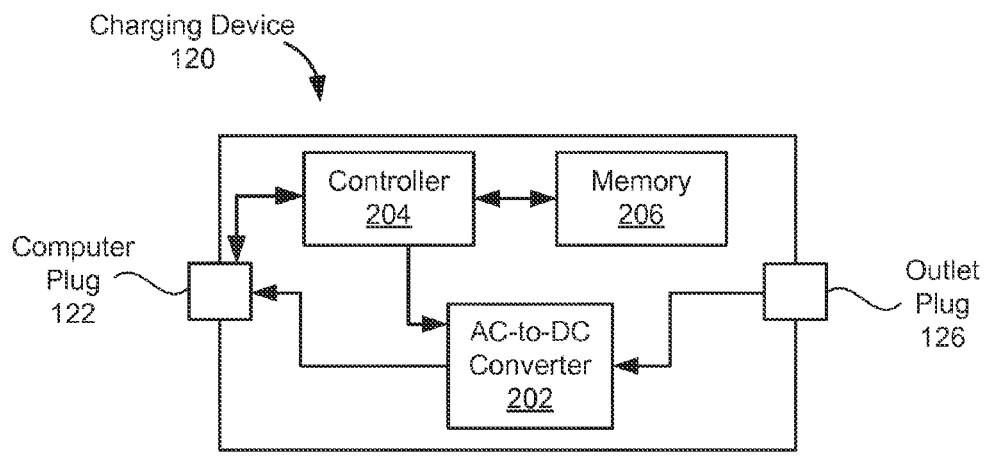
FIG. 2A is a schematic diagram of the charging device according to an example embodiment.

FIG. 2A is a schematic diagram of the charging device 120 according to an example embodiment. As shown in FIG. 2A, the charging device 120 may include the outlet plug 126, which receives AC power from the outlet 142 (not shown in FIG. 2A). The charging device 120 may also include the computer plug 122 that provides power to, and sends and receives signals to and from, the computing device 102 (not shown in FIG. 2A).

The charging device 120 may also include an AC-to-DC converter 202. The AC-to-DC converter 202 may receive power from the outlet 142 via the outlet plug 126 and/or outlet cord 128 (not shown in FIG. 2A). The AC-to-DC converter 202 may convert the AC power received from the outlet 142 to DC power to provide to the computing device 102. The AC-to-DC converter 202 may provide the power to the computer device 102 via the computer plug 122 and/or computer cord 124 (not shown in FIG. 2A). The voltage, current, power, or other metric of the DC power that the AC-to-DC converter 202 provides to the computing device 102 may be variable and/or controlled by a signal received by the AC-to-DC converter 202.

The charging device 120 may include a controller 204. The controller 204 may be an embedded controller. The controller 204 may execute instructions stored by memory 206. The instructions may include instructions to communicate with and/or engage in a handshake protocol with the computing device 102, and/or control the voltage, current, power, or other metric of power provided by the AC-to-DC converter to the computing device 102. The controller 204 may also provide and/or store updates to the memory 206.

The controller 204 may also provide signals to and/or control the AC-to-DC converter 202. The controller 204 may, for example, control a voltage level and/or current level at which the AC-to-DC converter 202 provides power to the computing device 102. The controller 204 may, for example, control the voltage level of the power provided by the AC-to-DC converter 202 based on firmware and/or instructions stored in the memory 206.

Figure 2B:
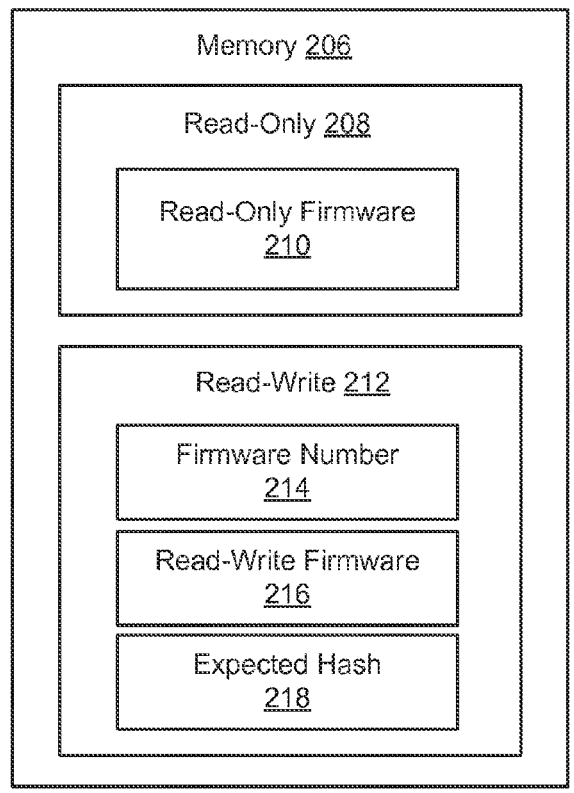
FIG. 2B is a schematic diagram of a memory included in the charging device according to an example embodiment.

FIG. 2B is a diagram of the memory 206 included in the charging device 120 according to an example embodiment. In this example, the memory 206 may include a read-only portion 208 and a read-write portion 212. The read-only portion 208 may include data and/or instructions stored in the memory 206 at the time of manufacture, and which may not later be changed. The read-only portion 208 may include read-only firmware 210. The read-only firmware 210 may include instructions executable by the controller 204 and which may not be changed. The controller 204 may, for example, first execute the instructions stored in the read-only firmware 210 upon bootup or powering on, and then if instructed to do so by the read-only firmware 210, execute instructions stored in a read-write portion 212 of the memory 206.

The read-write portion 212 of the memory 206 may include instructions, firmware, and/or data which are updatable. The read-write portion 212 of the memory 206 may, for example, include a firmware number 214. The firmware number 214 may indicate the most recent update or version of the firmware stored in the read-write portion 212. The firmware number 214 may be used by the computing device 102 to determine whether a more recent update of the firmware is available and/or needed.

The read-write portion of the memory 206 may also include read-write firmware 216. The read-write firmware 216 may specify allowable voltage, current, and/or power levels for the charging device 120 to provide power to the computing device 102. The read-write firmware 216 may be updatable. The read-write firmware 216 may be updatable, for example, when the computing device 102 determines that the firmware of the charging device 120 should be updated. The read-write firmware 216 may include instructions executable by the controller 204.

The read-write portion 212 of the memory 206 may also include an expected hash 218. The expected hash 218 may include a hash value calculated based on the instructions stored in read-only firmware 210 or the read-write firmware 216. The expected hash 218 may be a value received by the charging device 120 from the computing device 102 as part of the firmware update process. The controller 204 and/or the computing device 102 may check the expected hash value 218 against a calculated hash value of the read-write firmware 216 to determine whether the read-write firmware 216 stored in the read-write portion 212 of the memory 206 is valid. Instructions to perform an integrity check on the instructions by calculating and comparing the hash value may be stored in either the read-only portion 208 of the memory 206 or the read-write portion 212 of the memory 206.

Figure 2C:
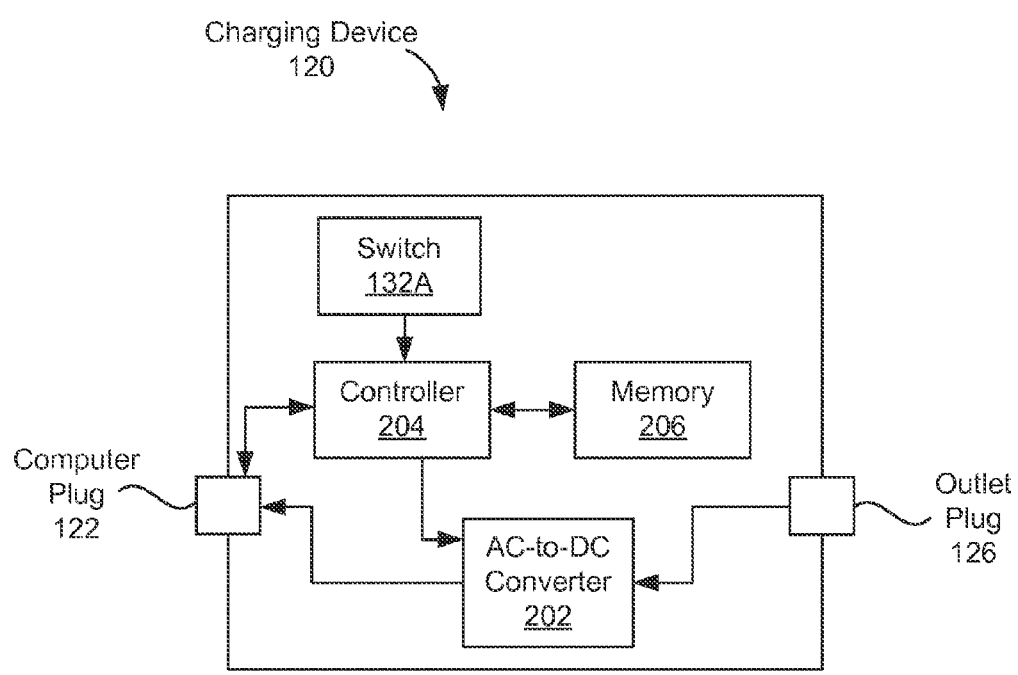
FIG. 2C is a diagram of the charging device according to another example embodiment.

FIG. 2C is a diagram of the charging device 120 according to another example embodiment. In this example, the charging device may include the AC-to-DC converter 202, the controller 204, and memory 206, which may perform functions as described above with respect to FIG. 2A.

In the example shown in FIG. 2C, the charging device 120 may also include a switch 132A. The switch 132A may maintain a state or mode based on a position of the switch 132 (shown in FIGS. 1B and 1C). The switch 132A may, for example, maintain either a first state or a second state. The switch 132A may send a signal to the controller 204 indicating whether the switch 132A is in the first state or the second state. Based on whether the switch 132A is in the first state or the second state, the controller 204 may cause the charging device 120 to be in either the first mode, in which the charging device 120 may provide power to the computing device 102 but may not receive firmware updates and/or modify the read-write portion 212 of the memory 206, or the second mode, in which the charging device 120 may receive updates and/or modify the read-write portion 212 of the memory 206, but may not provide power to the computing device 102.

Figure 3:
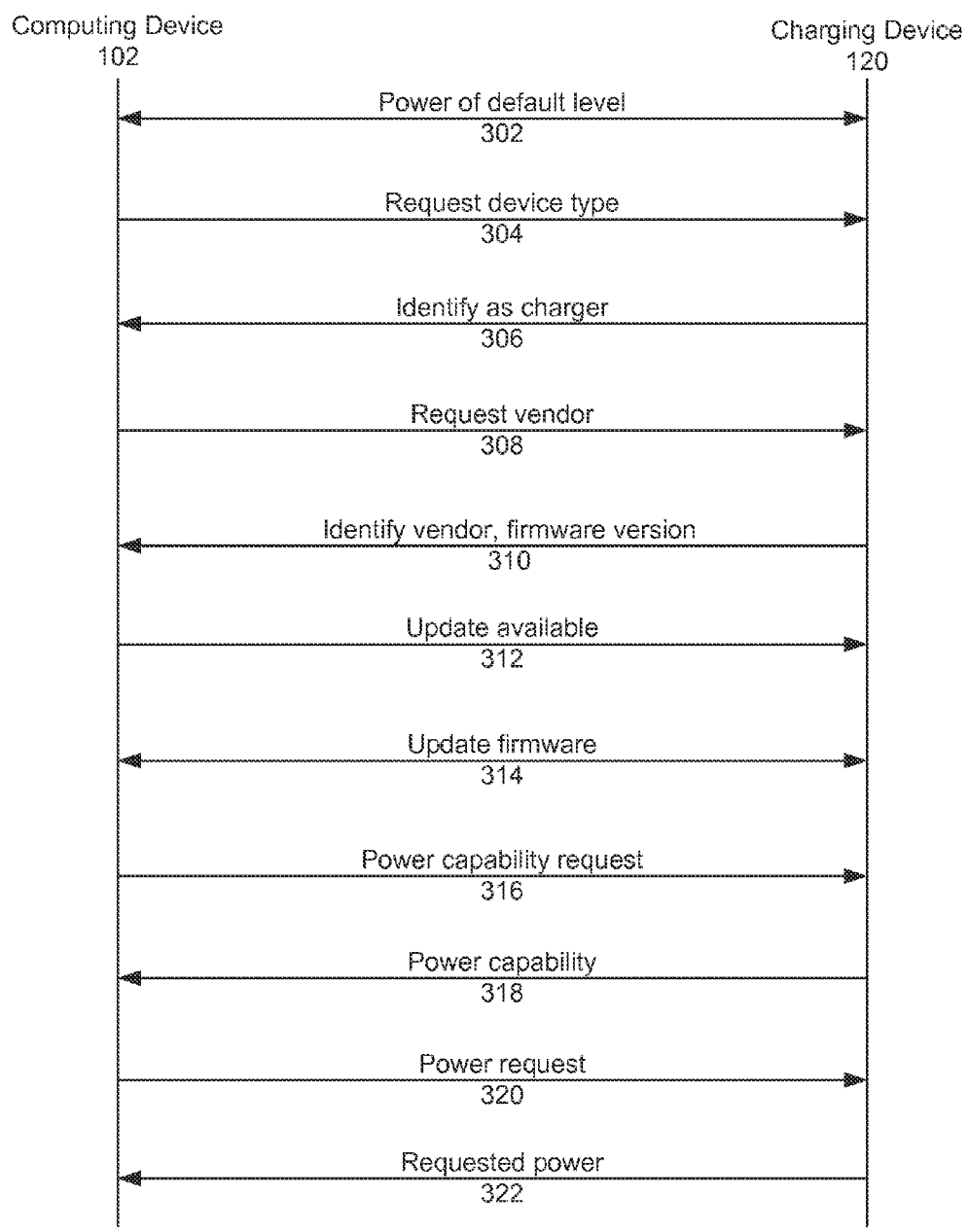
FIG. 3 is a timing diagram showing messages exchanged between the computing device and the charging device according to an example embodiment.

FIG. 3 is a timing diagram showing messages exchanged between the computing device 102 and the charging device 120 according to an example embodiment. In this example, the computer plug 122 of the charging device 120 may have been recently inserted into the power input 112 of the computing device 102.

Upon insertion of the computer plug 122 into the power input 112, the charging device 120 may begin providing power to the computing device 102 at a default voltage, current, and/or power level (302). The default voltage, current, and/or power level may be a safe voltage, current, and/or power level which is or are safe for all possible devices to which the charging device 120 may provide power. The default level may, for example, be a voltage, current, and/or power level which is or are expected not to harm or cause damage to any device which is chargeable by the charging device 120.

The computing device 102 may request the device type (304) from the charging device 120. The computing device 102 may request the device type (304) to determine the capabilities of the charging device 120. The charging device 120 may respond to the request for the device type (304) by sending a message to the computing device 102 identifying the charging device 120 as a charger (306). The charging device 120 may identify itself as a generic charging device, which performs according to specified protocols, or may additionally identify itself by manufacturer and/or model.

After receiving the device type of the charging device 120, the computing device 102 may send a vendor request message (308) to the charging device 120. The computing device 102 may additionally or alternatively request a firmware version from the charging device 120. The charging device 120 may respond the vendor request message (308) by identifying the vendor and/or firmware version (310). The charging device 120 may, for example, identify the vendor and/or manufacturer of the charging device 120 and may identify the firmware version stored in the firmware number 214 of the read-write portion 212 of the memory 206.

After receiving the firmware version from the charging device 120, the computing device 102 may determine whether a firmware update for the charging device 120 is available. If the computing device 102 determines that a firmware update is available, then the computing device 102 may send an update available message (312) to the charging device 120. The computing device 102 and charging device 120 may then update the firmware (314) of the charging device 120 according to procedures described herein. In an example embodiment, to ensure the identity and/or authenticity of the computing device 102, the charging device 120 may update the firmware (314) only upon receiving a cryptographic signature from the computing device 102.

After the firmware of the charging device 120 has been updated (314), or if the firmware did not need to be updated, the computing device 102 may send a power capability request message (316) to the charging device 120. The power capability request (316) may inquire at what voltage levels or other metrics (such as current or power) the charging device 120 is capable of providing power to the computing device 102. The charging device 120 may respond to the power capability request (316) with a power capability message (318). The power capability message (318) may indicate power levels or voltage and/or current levels at which the charging device 120 is capable of providing power. After receiving the power capability message (318), the computing device 102 may send a power request message (320) to the charging device 120. The power request message (320) may select one of the power, voltage, and/or current levels indicated by the power capability message (318), at which the computing device 102 requests the charging device 120 to provide power to the computing device 102. The charging device 120 may then provide the power at the requested level (322) to the computing device 102. Providing the power at the requested level (322) may include either increasing or decreasing the power from the default level at which power was initially provided (302).

Figure 4:
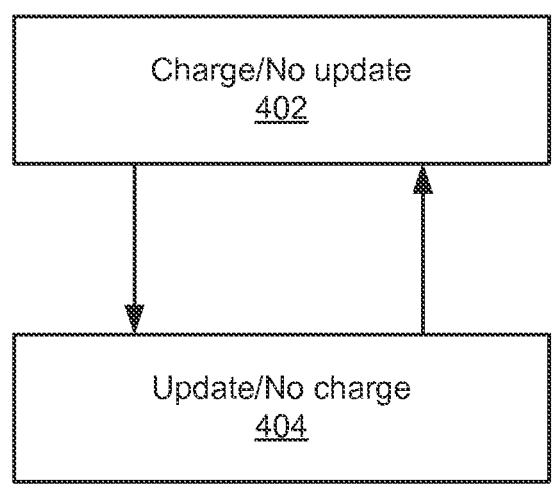
FIG. 4 is a diagram showing states of the charging device in an example in which the charging device can be switched or toggled between two states or modes.

FIG. 4 is a diagram showing states of the charging device 120 in an example in which the charging device 120 can be switched or toggled between two states or modes. The charging device 120 may be in a first state 402 or mode when the switch 132 is in a first position, and in a second state 404 or mode when the switch 132 is in a second position. In an example embodiment, the charging device 120 may change states only when the charging device 120 is unplugged and/or only when the outlet plug 126 (shown in FIG. 1A) is not plugged into the outlet 142 (shown in FIG. 1A). In this example, if the switch 132 is moved while the outlet plug 126 is plugged into the outlet 142, the charging device 120 may remain the state or mode that the charging device 120 was in before the switch was moved.

The first state 402 or mode may include a charge/no update state or mode. In the first state 402 or mode the charging device 120 may recharge and/or provide power to the computing device 102, but may not receive any firmware updates from the computing device 102. In this state or mode the read-write portion 212 of the memory 206 may not be modified.

The charging device 120 may include a second state 404 or mode in which updates may be made, but no charging or power will be provided or performed to the computing device 102. In the second state 404 or mode, the charging device 120 may receive firmware updates from the computing device 102, and/or may modify the read/write portion 212 of the memory 206, but will not provide any power or charge to the computing device 102. In the second state 404 or mode, if the computing device 102 queries the charging device 120 for the power or charging capabilities of the charging device 120, the charging device 120 will respond that the power or charging capabilities of the charging device 120 are none and/or that the charging device 120 has no power or charging capabilities. Because the charging device 120 will not provide power in the second state 404 or mode, the user is unlikely to leave the charging device 120 in the second state 404 or mode, reducing the vulnerability of the charging device 120 to malicious firmware updates.

Figure 5:
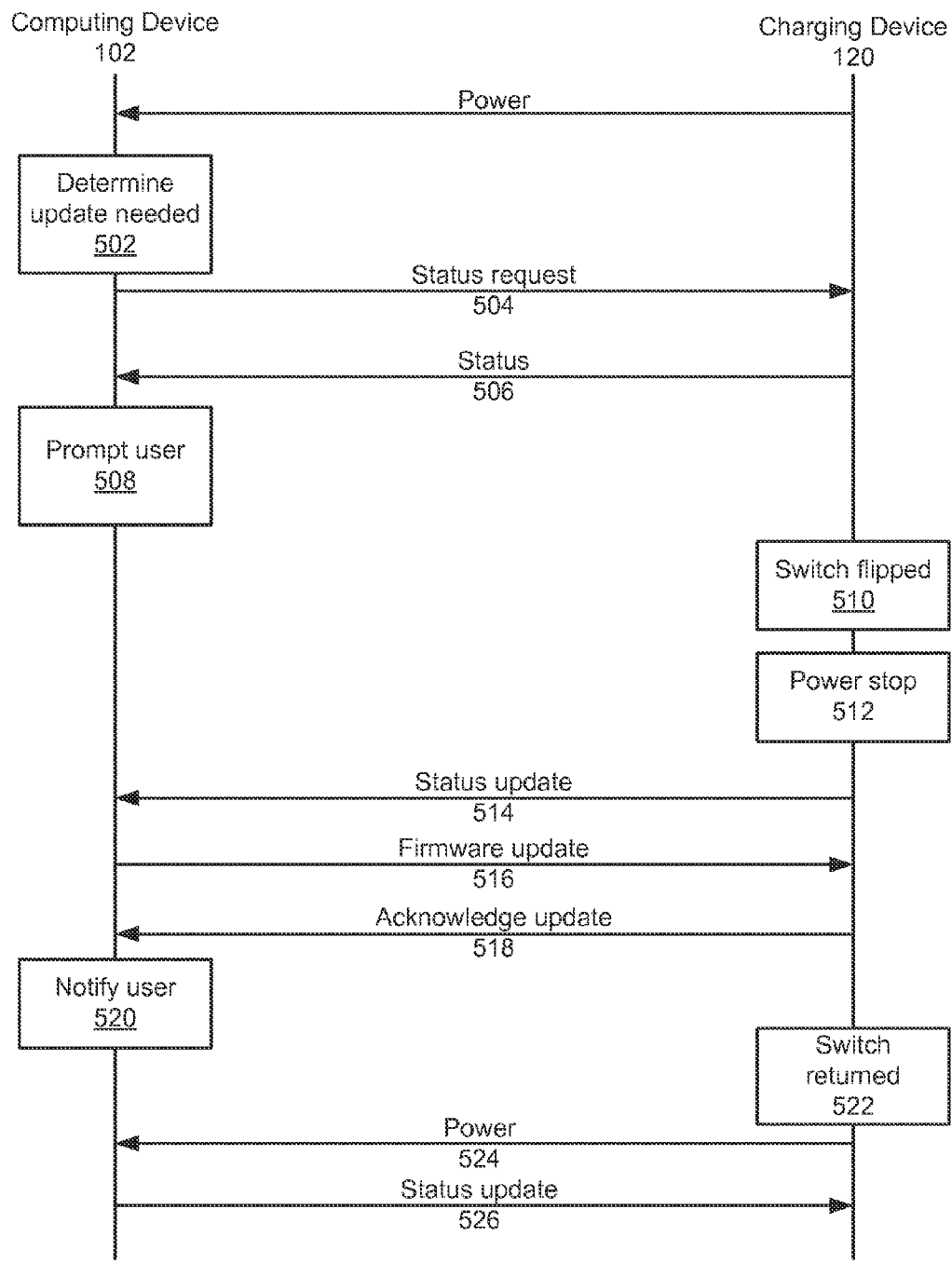
FIG. 5 is a timing diagram showing processes and messages performed by the computing device and charging device in an example in which the charging device may toggle between the two states or modes shown and described with respect to FIG. 4.

FIG. 5 is a timing diagram showing processes and messages performed by the computing device 102 and charging device 120 in an example in which the charging device 120 may toggle between the two states 402, 404 or modes shown and described with respect to FIG. 4. In this example, the charging device 120 may provide power (501) to the computing device 102 at a default voltage, current, and/or power level, as described above with respect to (302). The computing device 102 may determine whether an update of the charging device's 120 firmware is needed (502). The computing device 102 may determine whether the update is needed based, for example, on the firmware version (310) received from the charging device, and a most recent firmware version stored by the computing device 102, which the computing device 102 may have retrieved from a remote server via the Internet.

The computing device 102 may send a status request (504) to the charging device 120. The status request (504) may, for example, request the firmware version from the charging device 120 and/or may inquire whether the charging device is in the first state 402 or mode or the second state 404 or mode. The charging device 120 may respond to the status request (504) by sending a status (506) to the computing device 102. The status (506) may indicate a firmware version stored in the charging device 120 and/or indicate whether the charging device 120 is in the first state 402 or mode or the second state 404 or mode.

If the computing device 102 determines that an update is needed and/or that the charging device 120 is in the first state 402 or mode, the computing device 102 may prompt the user (508) to toggle or switch the charging device 120 from the first state 402 to the second state 404. The computing device 102 may prompt the user (508) by, for example, presenting text on the display 106 (not shown in FIG. 5) requesting or instructing the user to flip or move the switch 132 (not shown in FIG. 5) on the charging device 120. The user may then switch or flip the switch 132 of the charging device 120. Based on the user flipping the switch, the charging device 120 may transition from the first state 402 or mode to the second state 404 or mode. In the second state 404 or mode, the charging device 120 may stop providing power (512) to the computing device 102.

After transitioning from the first state 402 or mode to the second state 404 or mode, the charging device 120 may send a status update (514) to the computing device 102. The status update 514 may indicate that the charging device 120 is in the second state 404 or mode and is ready to receive firmware updates. In an example embodiment, the computing device 102 may also interpret the ceasing of providing power (512) as the status update (514) indicating that the charging device 120 is ready to receive firmware updates. After receiving the status update (514), the computing device 102 may send the firmware update (516) to the charging device 120. The firmware update (516) may include read/write instructions for the charging device 120 to store in the read-write firmware 216 of the read-write portion 212 of the memory 206.

The controller 204 of the charging device 120 may store the instructions and/or firmware in the memory 206. The controller 204 may perform an integrity check of the updated instructions such as performing a checksum or hash on the updated instructions and comparing the checksum or hash to a value provided by the computing device 102 and/or stored in the expected hash 218 of the memory 206, and if the updated instructions pass the integrity check, the charging device 120 may acknowledge the update (518) of the firmware. If the updated instructions do not pass the integrity check, such as because the firmware update (516) was interrupted by either the computing device 102 or charging device 120 being powered off before the firmware update was complete, the firmware update (516) may be performed and/or provided to the charging device 120 again.

Upon receiving the acknowledgment of the update (518), the computing device 102 may notify the user (520) that the firmware has been updated and/or instruct the user to switch the charging device 120 back to the first state 402 or mode. The computing device 102 may notify the user (520) by, for example, presenting text on the display 106 requesting or instructing the user to move the switch back to the previous position.

The charging device 120 may then have its switch returned (522) to the first position by the user, and transition back to the first state 402 or mode. The charging device 120 may then resume providing power (524) to the computing device 102. The charging device 120 may then provide a status update (526) to the computing device 102. The status update (526) may indicate that the charging device 120 is in the first state 402 or mode and is ready to resume providing power to the computing device 102. In an example embodiment, the providing power (524) to the computing device 102 may be interpreted by the computing device 102 as the status update (526).

Figure 6:
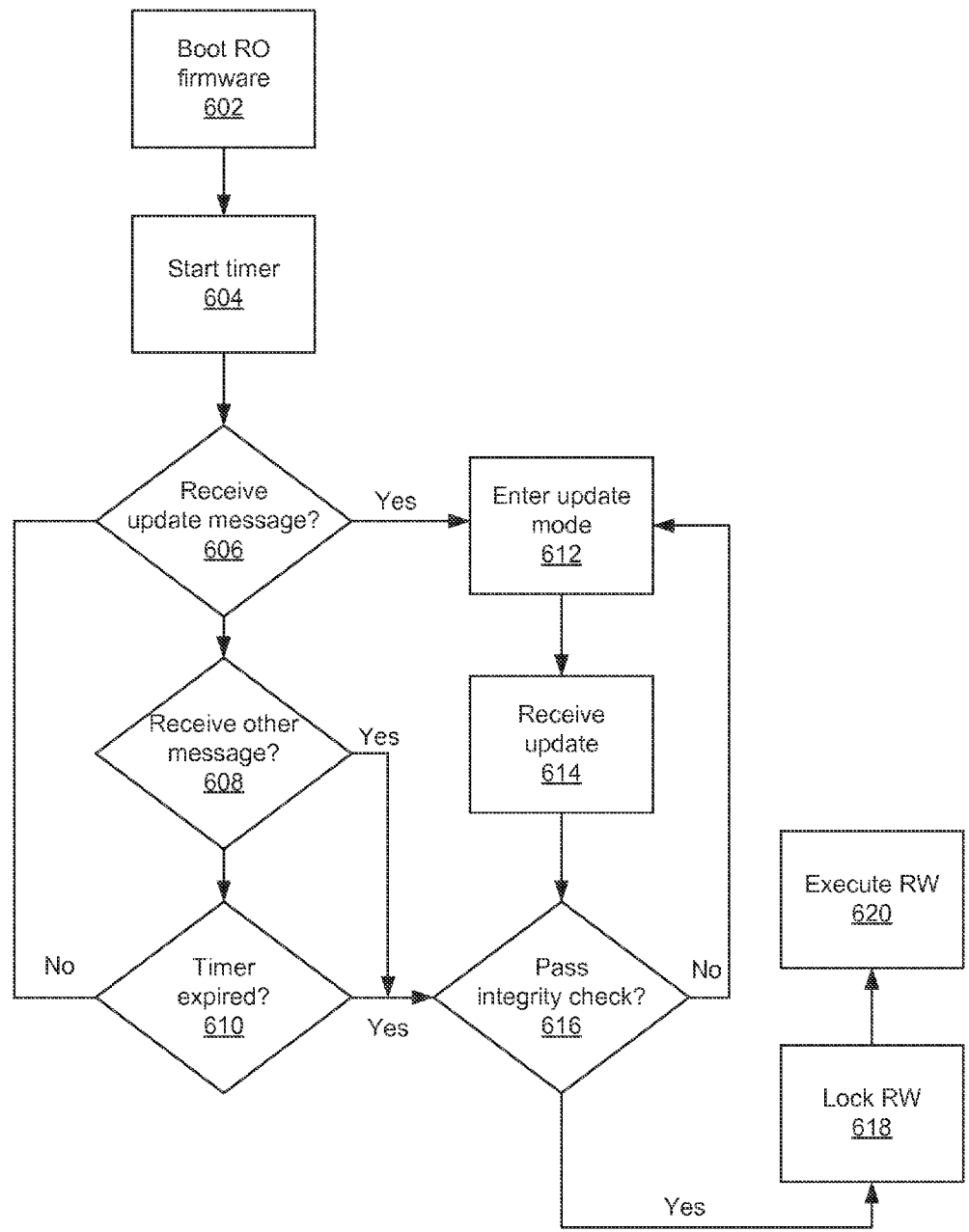
FIG. 6 is a flowchart showing functions performed by the charging device according to another example embodiment.

FIG. 6 is a flowchart showing functions performed by the charging device 120 according to another example embodiment. In this example, the charging device 120 may receive firmware updates only if it receives an update message during an update window after receiving power and/or being plugged into the outlet 142. The limitation of receiving updates only if the update message is received during the update window after receiving power and/or being plugged in may minimize the window of vulnerability of the charging device 120, including preventing viruses that infect the computing device 102 during use of the computing device 102 from infecting the charging device 120.

In this example, upon initially receiving power from the outlet 142, the charging device 120 may boot from the read-only firmware (602). Upon booting from the read-only firmware (602), the charging device 120 may start a timer (604). The timer may create an update window during which the charging device 120 may receive firmware updates, or begin a firmware update process. The update window may be created and/or the timer started upon each plugging in of the charging device 120, or only after the charging device has been plugged into the outlet 142 a threshold number greater than one, such as three, times during a predetermined time period. The update window may be created and/or the timer started only if the outlet plug 126 is plugged into the outlet 142 after the computer plug 122 has already been plugged into the power input 112, according to an example embodiment. According to an example embodiment, the charging device could periodically reboot (602), create the update window, and/or start the timer while the outlet plug 126 is plugged into the outlet 142.

In an example embodiment, the computing device 102 may prompt the user to unplug (remove the outlet plug 126 from the outlet 142) the charging device 120 and plug (insert the outlet plug 126 into the outlet 142) the charging device 120 into the wall 140. The computing device 102 may prompt the user to unplug and plug the charging device 120 based on determining that the charging device 120 needs a firmware update and/or based on determining that a more recent firmware version that the firmware version that is stored in the charging device 120 is available.

During the update window, the charging device 120 may determine whether the charging device 120 has received an update message (606). The charging device 120 may also provide power to the computing device 102 at a default level during the update window. If the charging device 120 has received an update message, then the charging device 120 may enter an update mode (612). During the update mode the charging device 120 may receive firmware updates (614) from the computing device 102. After receiving the update (614), the charging device 120 may determine whether the updated firmware passes an integrity check (616). The charging device 120 may determine whether the updated firmware passes the integrity check by, for example, performing a hash or checksum on the updated firmware 216 and comparing the hash or checksum to the expected hash value 218 stored in the memory 206, which may have been received from the computing device 102 during the firmware update. If the firmware update does not pass an integrity check, such as because the charging device 120 or computing device 102 was interrupted such as by powering off before the firmware update was complete, then the charging device 120 may reenter the update mode (612), and receive updates again (614).

If the charging device 120 did not receive an update message (606), then the charging device 120 may determine whether the charging device 120 has received any other messages (608). If the charging device 120 has received another message, which may indicate that the computing device 102 is requesting the charging device to perform a process or function (such as provide power to the computing device 102) other than receive a firmware update, then charging device 120 may determine whether the firmware stored in the charging device 120 passes an integrity check (616). If the charging device 120 has not received any other messages, the charging device 120 may determine whether the timer has expired (610). If the timer has expired, then the charging device 120 may determine whether the previously stored firmware passes the integrity check (616). If the timer has not expired, then the charging device 120 may continue determining whether an update messages been received (606) until the timer expires.

After passing the integrity check, the charging device 120 may lock the read-write portion 212 of the memory 206 (618). Locking the read-write portion 212 of the memory (618) may prevent any further changes to the firmware. After locking the read/write portion 212 of the memory (618), the charging device 120 may execute the firmware instructions 216 stored in the read-write portion 212 of the memory (620).

Figure 7:
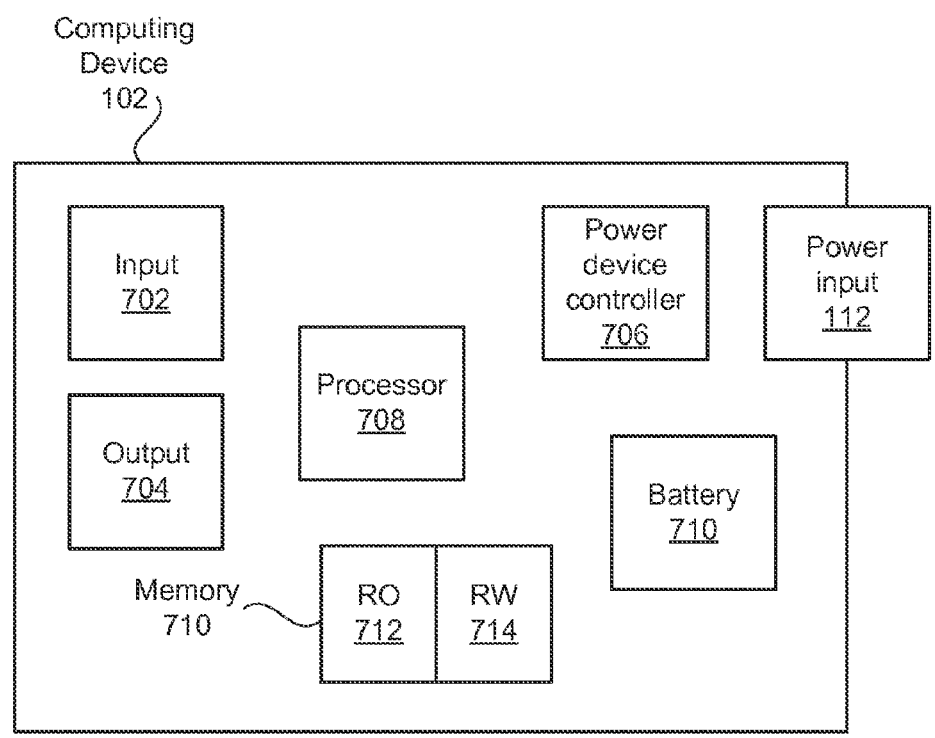
FIG. 7 is a schematic diagram showing components of the computing device according to an example embodiment.

FIG. 7 is a schematic diagram showing components of the computing device 102 according to an example embodiment. The computing device 102 may include an input component 702 and an output component 704. The input component 702 may include, for example, human interface devices such as the keyboard 108 and trackpad 110. The input 702 may also include the display 106 in an example in which the display is a touchscreen. The output 704 for may include, for example, the display 106, speakers, or other output devices. The input device 702 and output device 704 may also include a network interface or other file interface.

The computing device 102 may also include a processor 708. Processor 708 may be capable of executing instructions, such as instructions stored in memory 710. The memory 710 may include read-only memory 712 and read-write memory 714.

The computing device 102 may also include a power device controller 706. The power device controller 706 may communicate with the charging device 120, such as by providing firmware updates and sending and receiving messages to and from the charging device 120 as described in any of the examples above. The power device controller 706 may communicate with the charging device 120 via the power input 112.

The computing device 102 may also include a rechargeable battery 710. The rechargeable battery 710 may provide power to the components or devices of the computing device 102. The rechargeable battery 710 may receive power from the charging device 120 (not shown in FIG. 7) via the power input 112.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various buses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A charging device comprising:
   a computer plug configured to provide power to a computing device and receive data from the computing device;

an outlet plug configured to receive alternating current (AC) power from an electrical outlet;

an AC-to-DC converter configured to convert the AC power received by the outlet plug from the electrical outlet into direct current (DC) power and provide the DC power to the computing device via the computer plug;

a controller configured to control a voltage and/or current of the DC power based on data received from the computing device and instructions stored in a memory; and the memory comprising:

a read-only portion comprising instructions for the controller to modify a read-write portion of the memory based on data received from the computing device via the computer plug; and the read-write portion comprising instructions for the controller to set the voltage of the DC power based on the data received from the computing device.

2. The charging device of claim 1, wherein the computer plug comprises a Universal Serial Bus (USB) plug.

3. The charging device of claim 1, wherein the read-only portion comprises instructions for the controller to modify a read-write portion in response to receiving a cryptographic signature from the computing device via the computer plug.

4. The charging device of claim 1, wherein the controller is configured to cause the charging device to provide power to the computing device at a default level and increase or decrease the power level based on the data received from the computing device.

5. The charging device of claim 1, wherein, upon powering on, the controller is configured to execute only the instructions stored in the read-only portion of the memory.

6. The charging device of claim 5, wherein the instructions stored in the read-only portion of the memory include instructions to execute instructions stored in the read-write portion of the memory.

7. The charging device of claim 1, wherein the read-only portion of the memory includes at least one instruction configured to cause the controller to send a firmware version to the computing device, the firmware version being stored in the read-write portion of the memory.

8. The charging device of claim 1, wherein the read-only portion of the memory includes at least one instruction configured to cause the controller to send a firmware version to the computing device in response to receiving a firmware version request from the computing device, the firmware version being stored in the read-write portion of the memory.

9. The charging device of claim 1, wherein the instructions stored in either the read-only portion of the memory or the read-write portion of the memory comprise instructions for the controller to perform an integrity check to confirm that the instructions stored in the read-write portion were accurately received.

10. The charging device of claim 9, wherein the instructions stored in the read-only portion of the memory comprise instructions to enter an update mode based on the instructions stored in the read-write portion failing the integrity check.

11. The charging device of claim 1, wherein the instructions stored in the read-only portion of the memory comprise instructions to:

start a timer upon receiving power via the outlet plug;

if the charging device receives an update request from the computing device before the timer expires, enter an update mode in which the controller modifies the read-write portion based on data received from the computing device via the computer plug after receiving the update request; and if the timer expires without the charging device receiving an update request from the computing device, ignore any subsequent update requests.

12. The charging device of claim 11, wherein the read-only portion of the memory comprise instructions to:

perform an integrity check on the data stored in the read-write portion of the memory after modifying the read-write portion of the memory;

if the data stored in the read-write portion of the memory passes the integrity check, lock the read-write portion of the memory and begin executing instructions stored in the read-write portion of the memory; and if the data stored in the read-write portion of the memory does not pass the integrity check, re-enter the update mode.

13. The charging device of claim 12, wherein the read-only portion of the memory comprises instructions for the charging device to provide power to the computing device at a default level while the charging device is in the update mode.

14. A charging device comprising:

a computer plug configured to provide power to a computing device and receive data from the computing device;

an outlet plug configured to receive alternating current (AC) power from an electrical outlet;

an AC-to-DC converter configured to convert the AC power received by the outlet plug from the electrical outlet into direct current (DC) power and provide the DC power to the computing device via the computer plug;

a controller configured to control a voltage of the DC power based on data received from the computing device and instructions stored in a memory;

the memory comprising:

a read-only portion comprising instructions for the controller to modify a read-write portion based on data received from the computing device via the computer plug;

the read-write portion comprising instructions for the controller to set the voltage of the DC power based on the data received from the computing device; and a switch configured to enable a user to toggle the charging device between:

a first mode in which the charging device can provide power to the computing device but cannot modify the read-write portion of the memory; and a second mode in which the charging device can modify the read-write portion of the memory but cannot provide power to the computing device.

15. The charging device of claim 14, wherein the switch comprises a physical switch on an external portion of the charging device.

16. The charging device of claim 14, wherein the switch comprises a magnetic switch.

17. The charging device of claim 14, further comprising:

at least one lighting device, wherein the charging device is configured to turn on the at least one lighting device in response to receiving a message from the computing device indicating that a firmware update is needed.

18. The charging device of claim 14, further comprising:
at least one lighting device, the at least one lighting device being configured to display at least a first color and a second color,
wherein the charging device is configured to cause the at least one lighting device to transition from displaying the first color to displaying the second color in response to receiving a message from the computing device indicating that a firmware update is needed.

19. The charging device of claim 14, further comprising:
at least one lighting device, the at least one lighting device being configured to blink,
wherein the charging device is configured to cause the at least one lighting device to blink in response to receiving a message from the computing device indicating that a firmware update is needed.

20. A charging device comprising:
a computer plug configured to provide power to a computing device and receive data from the computing device;
an outlet plug configured to receive alternating current (AC) power from an electrical outlet;
an AC-to-DC converter configured to convert the AC power received by the outlet plug from the electrical outlet into direct current (DC) power and provide the DC power to the computing device via the computer plug;
a controller configured to control a voltage of the DC power based on data received from the computing device and instructions stored in a memory; and
the memory comprising:
  a read-only portion comprising instructions for the controller to:
    modify a read-write portion based on data received from the computing device via the computer plug;
    start a timer upon receiving power via the outlet plug;
    if the charging device receives an update request from the computing device before the timer expires, modify the read-write portion based on data received from the computing device via the computer plug after receiving the update request; and
    if the charging device does not receive an update request from the computing device before the timer expires, exit the update mode and not modify the read-write portion; and
  the read-write portion comprising instructions for the controller to set the voltage of the DC power based on the data received from the computing device.

21. The charging device of claim 20, wherein the charging device does not include any user input components.

22. A computing device comprising:
a processor configured to execute instructions;
a memory comprising instructions executable by the processor;
a display configured to present images based on instructions received from the processor;
a power input configured to receive power from a charging device, provide power to the processor, the memory, and the display, and send instructions to the charging device; and
a power device controller configured to send instructions to the charging device via the power input, wherein the memory comprises instructions configured to cause the processor to:
determine that the charging device needs a firmware update; and
based on determining that the charging device needs a firmware update, instruct the display to present an image prompting a user to move a switch on the charging device.

* * * * *